Sept. 3, 1968   W. F. KARR   3,399,758
MOVING SIDEWALK
Filed Aug. 8, 1966   4 Sheets-Sheet 1
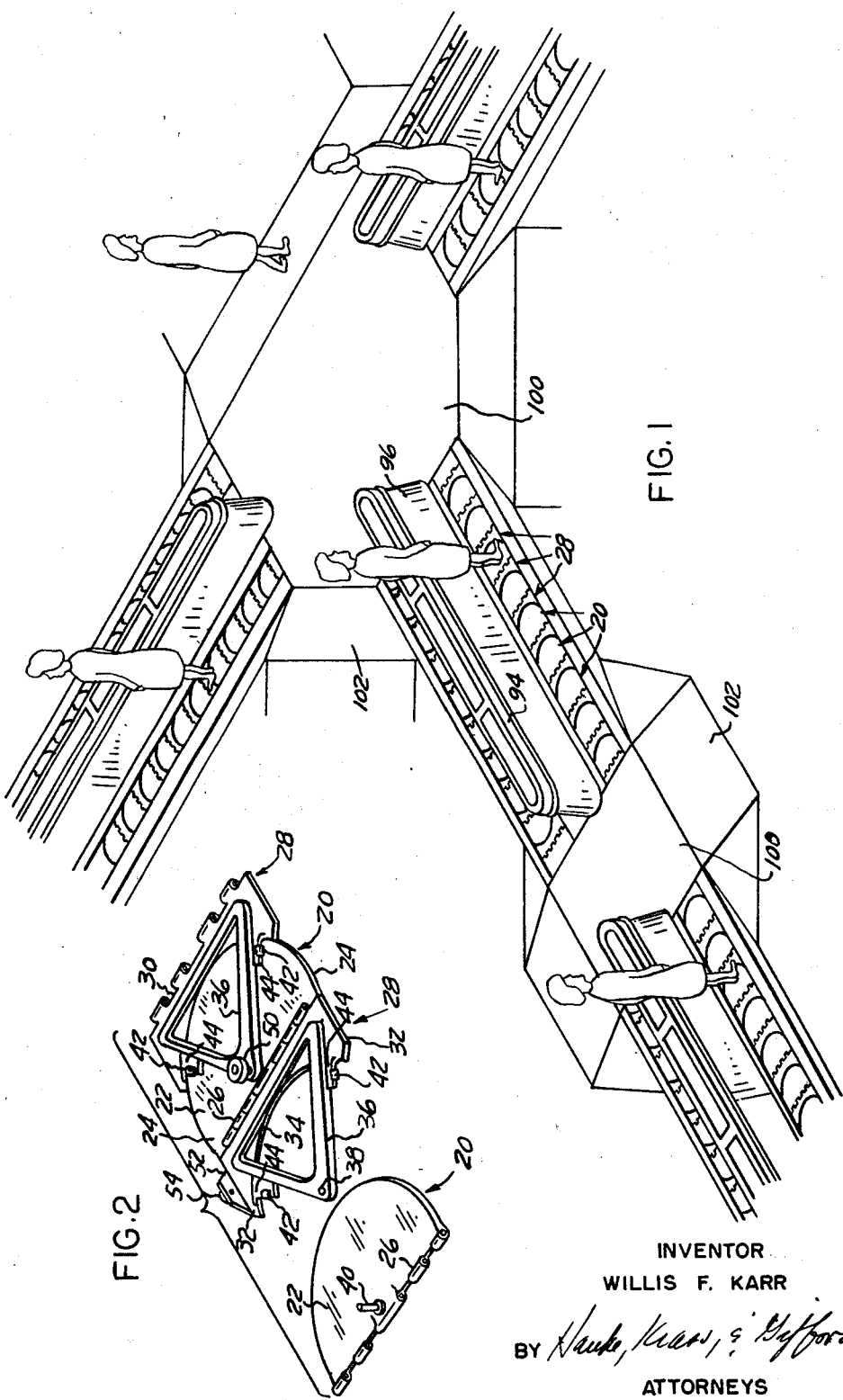
INVENTOR
WILLIS F. KARR
BY Hauke, Kiess, & Gifford
ATTORNEYS

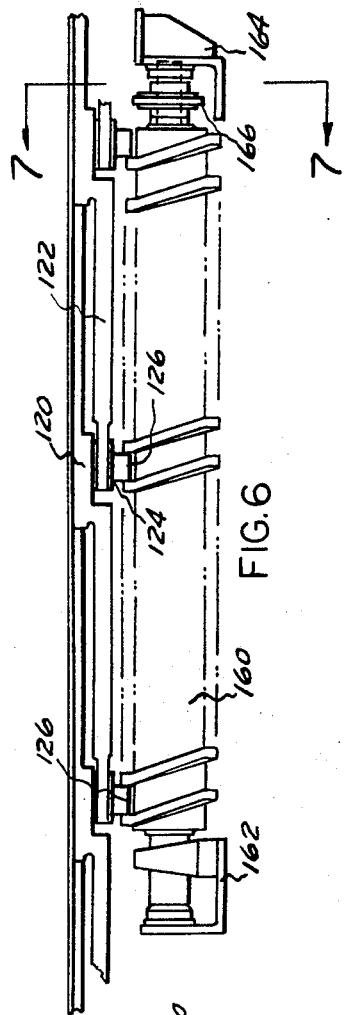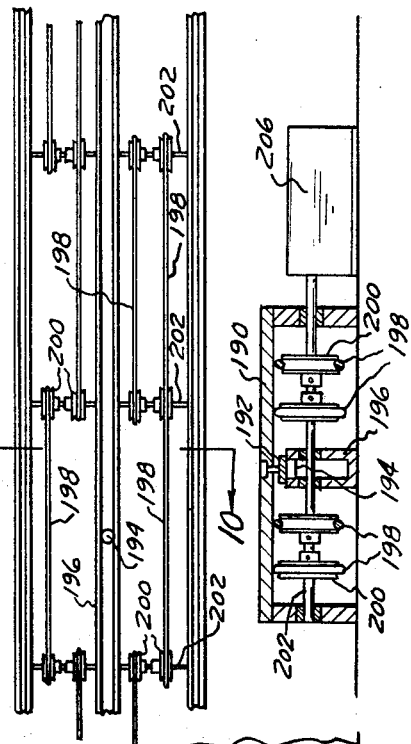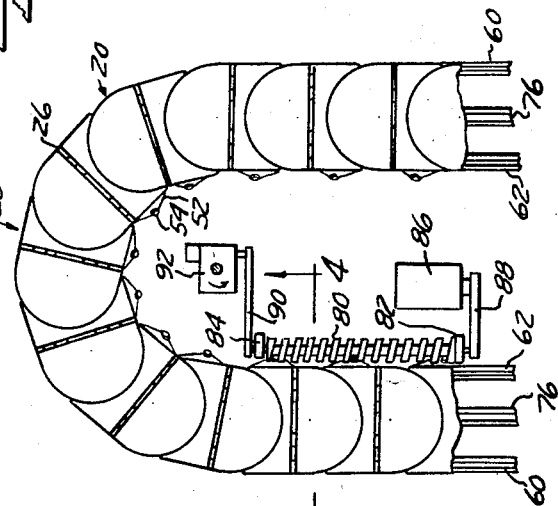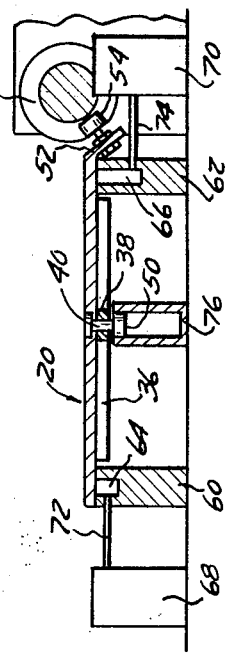

Sept. 3, 1968 W. F. KARR 3,399,758
MOVING SIDEWALK
Filed Aug. 8, 1966 4 Sheets-Sheet 3

INVENTOR
WILLIS F. KARR

BY Hauke, Krass, & Gifford
ATTORNEYS

Sept. 3, 1968 W. F. KARR 3,399,758
MOVING SIDEWALK
Filed Aug. 8, 1966 4 Sheets-Sheet 4
FIG. 11
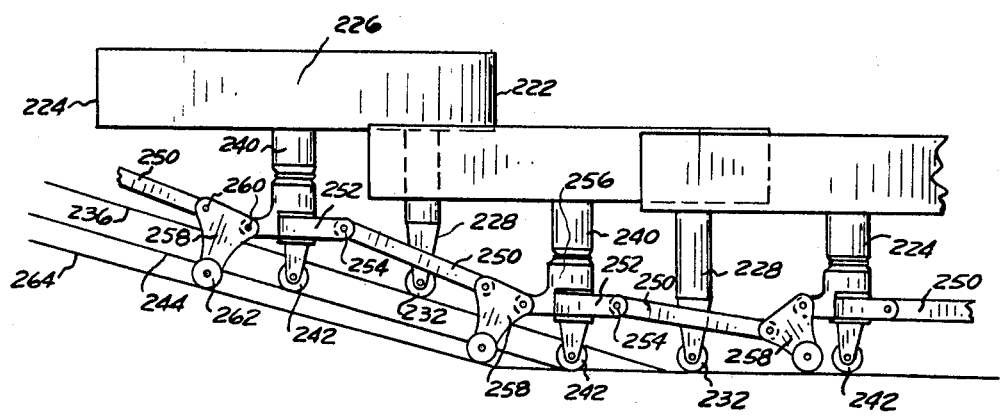
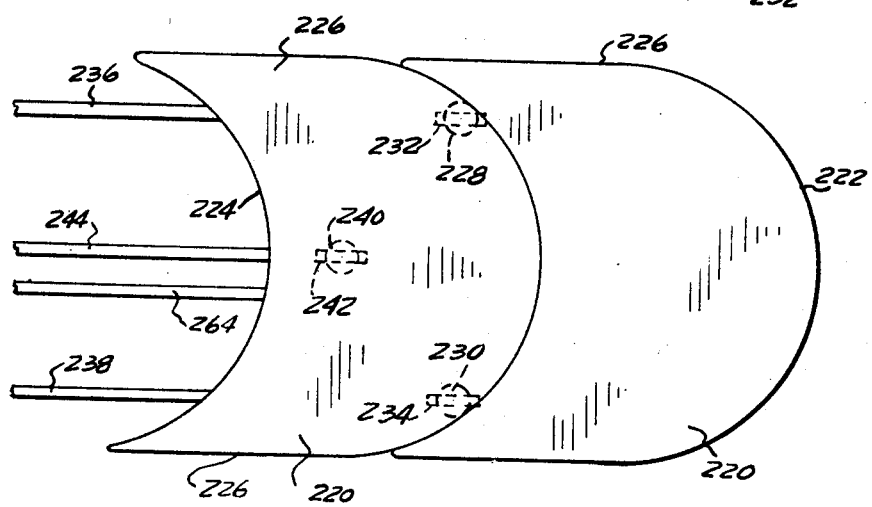
FIG. 12
INVENTOR
WILLIS F. KARR
BY Hauke, Krass, & Gifford
ATTORNEYS United States Patent Office 3,399,758
Patented Sept. 3, 1968

3,399,758
MOVING SIDEWALK
Willis Ford Karr, Warren, Mich., assignor to Federal Engineering Company, Inc., Detroit, Mich., a corporation of Michigan
Filed Aug. 8, 1966, Ser. No. 570,957
2 Claims. (Cl. 198—181)

ABSTRACT OF THE DISCLOSURE

A pedestrian conveyor is formed of a plurality of pallets having forward convex edges and trailing concave edges, joined together so the concave edge of one pallet abuts the convex edge of the next in the chain, by link arms which are pivotally supported on one pallet for motion in the plane of the surface of the pallet about the center of its convex edge, and are rigidly connected to the next pallet. In one embodiment the pallets are supported on guide rails by injecting pressurized air between the rails and abutting surfaces of the pallets. In another embodiment they are supported on a series of short belts arrayed along the course. In a third embodiment they are supported on short removable roll sections which extend transversely to the conveyor course along its length. One of the embodiments of the invention provides hinges extending transversely across the width of the pallets so that they may traverse vertical inclines. Another embodiment supports the pallets on three rails which are positioned vertically with respect to one another so that the pallets may traverse inclines while maintaining their upper surfaces in a horizontal position through a leg and link mechanism.

---

This invention relates to conveyors having planar horizontal upper surfaces adapted to transport persons and materials between spaced points.

The broad aspect of the invention consists in the provision of a plurality of pallets formed with planar upper surfaces having one edge of the surface formed in a concave circular arc and an opposed edge formed in a convex circular arc with connecting links joining adjacent pallets into a chain with the convex edge of one abutting the concave edge of the next. The links joining adjacent pallets are pivoted at one end at the center of the convex edge of the one of the pallets so as to restrain the motion of the pallet next adjacent on the convex side, in the plane of the planar surface, to a pivoting motion about the center of the convex edge. This maintains the pallets in contiguous relation while following a non-linear course.

A further aspect of the invention relates to a first pallet configuration which provides a hinge extending transversely across the width of the pallets, normally to their general direction of motion, which allows the pallets to bend in directions perpendicular their motion so as to form a return bend. Another aspect of the invention lies in the provision of linkages which allow various pallets to assume different horizontal levels with respect to one another, in the manner of an escalator, while still maintaining their contiguous relationship.

A still further aspect of novelty is the provision of a pallet supporting configuration employing rollers which are resiliently retained to provide a cushioning support for the pallets. An alternative support system utilizes a plurality of belts which are arrayed in short segments along the course of motion and support the pallets on their lower surfaces to also provide a cushioned travel.

The driving systems for the pallets along the courses established by the rollers or the belts may take either of two novel forms. In one, each of the pallets has a cam follower disposed below and depending from one of its sides, and along one point of the course such follower makes threading engagement with a screw which lies parallel to the direction of the motion of the pallets at that point, to provide the driving impulse. In an alternative embodiment of the driving system each of the pallets has a cam follower disposed from the center of its bottom side and the screw is disposed below and parallel to a section of the length of the conveyor so as to contact and mesh with the cam followers as they pass that point and drive them along.

Another aspect of novelty is in the provision of such conveyors in short closed loop segments which provide a forward and return motion path, a plurality of such segments being joined by flat, stationary platforms which allow persons moving along the conveyor to walk between them on the platforms which also provide crosswalks.

These and other areas of novelty, objects, advantages and applications will be made apparent by the following detailed description of various preferred embodiments of the invention. The descriptions make reference to the accompanying drawings in which:

FIGURE 1 is a perspective view of a plurality of conveyor sections formed in accordance with a first embodiment of the invention, providing a plurality of paths for transporting persons;

FIGURE 2 is a perspective view of the underside of a pair of pallets used in connection with the embodiment of FIGURE 1;

FIGURE 3 is a plan view of the return bend of one of the conveyor sections of FIGURE 1, with the stationary platform removed;

FIGURE 4 is a transverse sectional view through one of the conveyor courses, taken along line 4—4 of FIGURE 3;

FIGURE 6 is an elevational view through the drive mechanism of a second embodiment of the invention;

FIGURE 9 is a plan view of the pallet support system forming a third embodiment of the invention;

FIGURE 10 is a transverse sectional view taken along line 10—10 of FIGURE 9;

FIGURE 11 is a side view of a fourth embodiment of the invention representing a form of pallet which is capable of undergoing escalator type of operation; and FIGURE 12 is a top view of the pallet shown in FIGURE 11.

Figure 7:
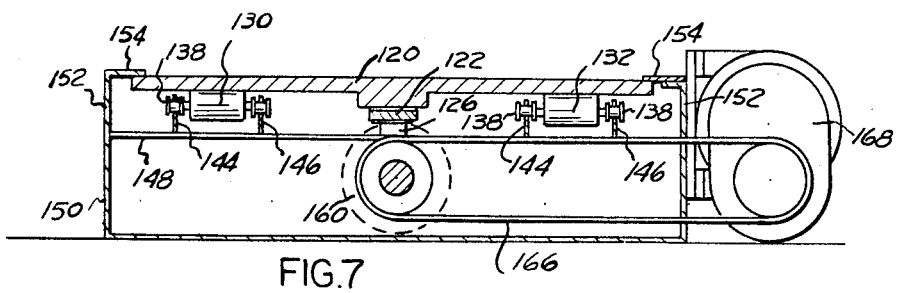
FIGURE 7 is an end view of the drive system of the embodiment of FIGURE 6, taken along line 7—7 of FIGURE 6.

Referring to the drawings a first embodiment of the invention is built about a plurality of pallets, parts of which are shown inverted in FIGURE 2 and top views in FIGURES 1 and 3. Each pallet is formed in two parts. One, generally indicated at 20 is formed of a flat plate having a semi-circular convex edge 22. The semi-circular edge preferably consists of a 180° arc and its two edges merge tangentially with short straight sides 24. The line between the straight sides, forming one edge of the pallet section 20 is joined by an elongated hinge member 26 to a second pallet section generally illustrated at 28. The section 28 has one straight edge 30 joined by the hinge 26 to the section 20, a pair of straight sides 32 which extend normally to the edge 26, and a concave semi-circular arc 34 which connects the two edges 32.

A three-sided, equilateral frame member 36 is fixed to the underside of the section 28 so that one of its apexes projects symmetrically across the concave arc 34. This projecting apex has a central hole 38 which is adapted to slide over a pin 40 projecting downwardly from the underside of the section 20 at the center of the convex edge 22. A pair of rollers 42 are rotatably supported in projections 44 which are joined to the triangular members 36 and on the members 28, and they are adapted to roll about axes which form radial lines to the concave arc 34. The surfaces of the rollers 42 project upwardly from their supports 44, and when the hole 38 on the apex of one of the triangular arms 36 is passed over the pin 40 on the adjacent section 26, the upper sides of the roller abut the underside of the member 26.

The proportions of the members are such that when in this relation the convex edge 22 of the section 26 is in immediate proximity to the concave edge 34 of one of the sections 28 and the rollers 42 and the pins 40 allow one of the sections to pivot with respect to one another in the plane of their surfaces. The hinges 26 allow the two sections 20 and 28 to bend with respect to one another about the axis of the hinge.

Figure 5:
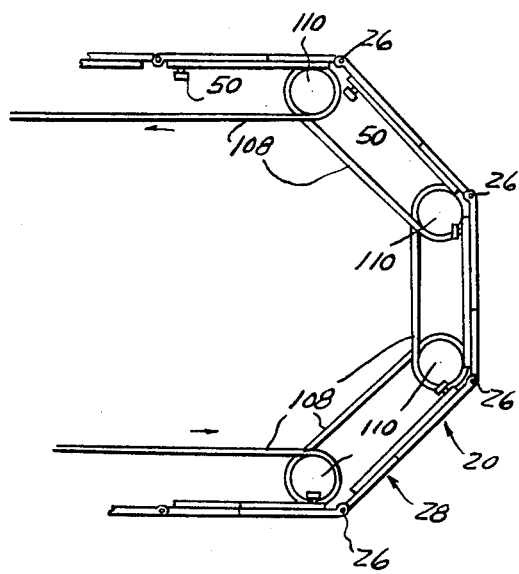
FIGURE 5 is an end view of a vertical return bend which a conveyor formed in accordance with FIGURE 1 is capable of undergoing.

It may be seen that a plurality of the sections 20 and 28 may be joined together by the arms 36 and the hinges 26 to form a closed loop. This loop may either be bent about an axis vertical to the surfaces of the pallets, as shown in FIGURE 3, to form return bends, or it may be bent about an axis parallel to the surfaces of the pallet, and to the hinge 26, in the manner shown in FIGURE 5. When bent as shown in FIGURE 5 the pallets surfaces bend with respect to one another at the hinges 26 as they traverse the return section. When a bend in the nature of FIGURE 3 is employed the pallet surfaces are always horizontal. In FIGURE 3 it can be seen that when the sections 20 and 28 bend with respect to one another no gap is formed between adjacent pallets because of the rotation of the concave edge 34 with respect to the convex edge 22.

The lower ends of the pins 40 project through the holes 38 in the apex in triangular member 36 and rotatably support rollers which thus project below the lowest point on the pallet.

The pallets are completed by downwardly projecting inclined plates 52 which project from one of the edges 32 of the sections 28 at inclined angles and rotatably support bearing drive members 54.

The closed chains of pallets thus formed may be supported and driven in a number of ways. In the first embodiment, as best seen in FIGURE 4, the track which the chains of pallets follows employs a pair of side upright support members 60 and 62 extending parallel to one another along the course. The outer edges of members 60 and 62 are separated from one another transversely by the width of the pallet section. The side edges of the pallets thus rest on the top of the members 60 and 62. Channels 64 and 66 are formed downwardly from the upper side of the members 60 and 62 and pressurized air is maintained in the channels by suitable blower members 68 and 70 which are disposed on the sides of the track and communicate with the channels through ducts 72 and 74 respectively. The pressure of the air in the channels 64 and 66 is maintained sufficiently high as to create an air bearing surface between the lower edges and the outer sides of the pallets and the support members 60 and 62. This bearing minimizes the friction between the elements and the driving forces required to move the pallets along their course.

A center guide member 76 is supported midway between the inner and outer supports 60 and 62 and is channel shaped in cross section with upwardly directed flanges. The guide channel 76 extends along the entire conveyor course between the side supports 60 and 62. The roller guide 50 of each of the pallets extends down into the upper open end of the channel 76 and makes a loose fit therewith. The sides of the channel thus restrain the motion of the pallets in their plane, and guide them along the course. The channel 76 thus guides the pallets and the air bearing supports 60 and 62 provide an upward force which retains any weight supported on the pallets.

The drive system for the pallets disclosed in FIGURES 3 and 4 consists of an elongated screw 80 having a square thread, which is rotatably supported parallel to the conveyor path at the interior side of the pallet course, along one straightaway section. The screw is rotatably journaled in bearing blocks 82 and 84 and is driven by an electric motor 86 through a belt drive 88. The screw engages the cam followers 54, associated with each of the pallet sections 28, as they move into the area of the screw. The screw is long enough to engage the cam followers 54 on three pallets simultaneously. These pallets push the pallets ahead of them and pull the pallets behind them to drive the entire pallet train over the course.

The far end of the screw 84 drives a second belt 90 which powers a right angle drive 92 having a vertical shaft. This shaft rotates suitable mechanism (not shown) for driving a handrail 94 in timed relation to the motion of the conveyor. The handrail is disposed adjacent to the upper edge of an elongated raised section 96 which extends between the two sides of the conveyor in the straightaway section and projects upwardly from them to form a separation between the two. The top of the raised section 96 is approximately waist high and the handrail 94 is formed of a resilient elongated extrusion and supported on the upper edge of the rail. The raised section 96 might be formed with transparent sections acting as display windows for various articles.

The conveyor sections are arranged in a plurality of courses and are separated by flat platforms 100 which cover the return sections and provide access between various conveyors. The platforms 100 are connected to the ground level by ramps 102 which allow the platforms to be used as cross walks or to gain access to and from the conveyor sections.

FIGURE 5 illustrates an alternative form of conveyor construction wherein the return bend is made about a horizontal axis so that the conveyor section returns in an inverted manner and only the upper section is useful for transport. Rather than being supported from the guides 60 and 62, the conveyor FIGURE 5 is supported on a plurality of belts 108 which are arrayed over rollers 110 in a staggered fashion. One side of the belt between the rollers supports the conveyor. The rollers at the end section are disposed so as to cause the belts to form a loop in a vertical plane about a horizontal axis. As the conveyor sections pass over this return section they bend about the hinges 26. Any of the disclosed forms of drive and guide means may be employed with this embodiment.

Figure 8:
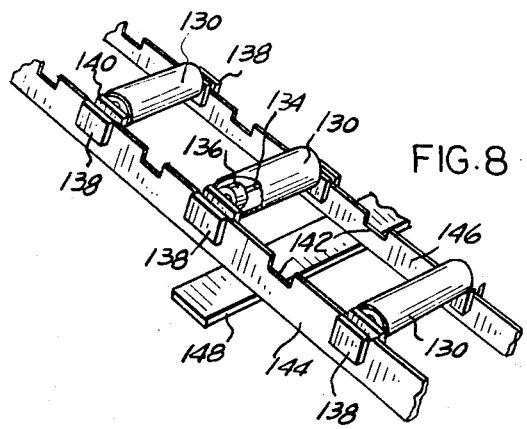
FIGURE 8 is a perspective view of the details of one of the roller supports employed in the embodiment of FIGURE 6.

An alternative form of drive and support system is illustrated in FIGURES 6, 7 and 8. The pallets employed with this embodiment are identical to those illustrated in FIGURE 2 except that they do not have the cam followers 54 or their supporting projections 52. Rather, the pallets are driven by the cam followers 50 which also act as guides.

As seen in FIGURE 6 the pallets employed with the embodiments of FIGURES 6, 7 and 8 does not utilize hinges but are rather constructed in single sections 120 and joined together by straight link arms 122 fixed to a pallet section and projecting over its concave edge. The other end of the arm connects to a pin 124 which projects downwardly from the center of the convex section. Pin 124 carries a cam follower 126 on its lower edge which serves as a guide of the adjacent pallet and drive element. The pallets 120 have flat undersurfaces and they are supported by two series of rollers 130 and 132 which are arrayed in two rows under the inner and outer sides of the pallets along the course of the conveyor and are rotatably supported about axes which project transversely to the conveyor course.

As is best seen in FIGURE 8 the rollers 130 are supported on shafts 134 by means of ball bearings 136. Each of the shaft ends projects outwardly of the roller and is retained in a hard rubber block 138. The blocks 138 have slots 140 which allows them to be removably inserted in grooves 142 formed at regular intervals in pairs of rails 144 and 146 which extend along the conveyor course. Two sets of rails are employed, one supporting the rollers 130 and the other supporting the rollers 132. The rails 144 and 146 are supported by cross elements 148 which project transversely to the conveyor course at regular intervals and are retained on a base member 150.

The rubber blocks allow individual roller members 130 and 132 to be replaced and also insulate the pallet from the supporting base 150 to provide a cushioned ride.

The base member 150 has a pair of upwardly projecting flanges 152 on opposed sides with inwardly directed lips 154 which extend above the opposed edges of the pallets to prevent any gaps from opening between the pallets and the supporting structure.

The embodiment of FIGURES 6, 7 and 8 is not capable of traversing any substantial incline because of the rigidity of the individual pallets. However, it is capable of traversing turns in the plane of the pallets by virtue of the pivoting of one pallet with respect to the adjacent pallets through the pivotable joints through the links 122 and the pins 124.

The drive system for the embodiment of FIGURES 6, 7 and 8 employs an elongated screw 160 having square threads which is supported within the base 150 centrally under the pallets and parallel to the conveyor course. Screw 160 is supported on a pair of end bearing blocks 162 and 164. It is rotated by a belt 166 from a drive motor 168 located on one side of the conveyor. The threads of the screw 160 mesh with the cam followers 126 as they pass over the screw area and provide the unit with the necessary driving impulse. Appropriate guide means (not shown) engage the cam followers 126 in the areas other than that which the screw 160 is contained, to limit its sideward motion.

Another support and driving system is illustrated in FIGURES 9 and 10. In this embodiment, which may employ belts of the same type illustrated in the embodiment of FIGURES 6, 7 and 8, the pallets 190 are connected by rigid links 192 and have downwardly projecting guide rollers 194. The guide rollers are aligned within central guiding channels 196 having open ends, for purposes of transverse alignment along the conveyor course. The pallet surfaces are supported on a plurality of belts 198 which are arrayed on pulleys 200 supported on rotatable shafts 202 which project transversely across the conveyor course at regular intervals. The belts are staggered with respect to one another, and a belt may be arrayed over a series of pulleys to provide a relatively continuous belt surface for the support of the pallet undersides. One or more of the shafts 202 along the conveyor course are powered by motor drive systems 206, located to one side of the conveyor course. The drive system rotates the pulleys associated with a particular powered shaft and thus rotates the belts. The motion of the bolts is transferred to the pallets driving them along their course. Thus the belts act as both a support and a drive system for the pallets.

The embodiment of the invention illustrated in FIGURES 11 and 12 is capable of moving along upward and downward inclines, either in a straight line or in a curved configuration, while still maintaining the pallet surfaces parallel to one another, much in the manner of an escalator. Since the pallets may move both at an incline and curve, they may be formed into a wide variety of configurations, including spirals.

The pallets employed in this embodiment have flat upper surfaces 220 with forward semi-circular convex edges 222 and rear semi-circular concave edges 224. Straight sides 226 join the rearmost portion of the convex arc to the edge of the concave arc. Rather than being formed in a thin, sheet-like configuration, the pallets of the present invention have sides which extend normally to the upper surface 220 for depth at least equal to the vertical separation which the surfaces of the pallets will undergo while traversing an incline.

Two side legs 228 and 230 project downwardly from the underside adjacent to opposed sides of the convex surface 228. They have wheels 232 and 234 at their lower edges which ride in support tracks 236 and 238 respectively. These tracks extend along the length of the conveyor course, parallel to one another, and provide essentially vertical support to the pallet, as will be subsequently described. Each of the pallets also has a downwardly extending central leg 240 which is of the same length as the legs 228 and 230 and has a wheel 242 supported on its lower edge. This wheel 242 is supported in a central track 244 which runs midway between the two side support rails 236 and 238.

Thus, each pallet is provided with a three point suspension on the tracks 236, 238 and 244. When the pallets are moving along a horizontal line these three tracks are at the same level, as is shown to the right in FIGURE 11. However, when the pallets must move along an incline, so that their upper surfaces are displaced with respect to one another, the two outer tracks 236 and 238 must be displaced with respect to the central track 244. At the left of FIGURE 11 it will be seen that the outer tracks 236 and 238 are elevated with respect to the central track 244, so that the pallet upper surface remains horizontal while traversing the grade.

The pallets are joined to one another by arms 250 which must be capable of pivoting with respect to both of the pallets in the horizontal plane, must be capable of pivotation in the vertical plane, and must be capable of changing the effective length between their connecting points on the legs 240 of adjacent pallets, as they move between an incline or a horizontal course. In order to achieve this the arms 250 are joined to one of the legs 240 by links 252 which are capable of pivoting in the horizontal plane and by links 254 which may pivot in the vertical plane. At their other end they are connected to the adjacent leg 240 by pivot elements 256 which are also capable of pivoting in the horizontal plane. Intermediate these two connections 254 and 256 they have carry cam support members 258. The members 258 are attached to the arms 250 and to the pivot members 256 by pin connection 260 which allow them to pivot in vertical plane.

The members 258 have downwardly projecting rollers 262 which ride a fourth track 264 that runs immediately adjacent to the center track 244, and act to modify the effective length of the link members 250 between their necessary distance when the pallets are moving horizontally and on the incline. As seen in FIGURE 11 when the pallets are moving along an incline, at their maximum inclination with respect to one another, the links 250 must extend the maximum distance between their connections with two adjacent pallets.

Accordingly, the track 264 is so aligned with respect to its adjacent track 244 that the members 258 provide the maximum length to links 250. When the pallets are moving in the horizontal, the effective distance of the links must be shortened. Accordingly, the rail 264 assumes the same level as the rails 244 the members 258 become cocked as seen to the right in FIGURE 11, effectively shortening the links 250.

Having thus described my invention, I claim:

1. A conveyor of the type described, comprising:
   a plurality of pellets each having flat upper surfaces, a first semi-circular convex edge and an opposed semi-circular concave edge;
   link members connecting the center of the convex edge of one pallet with the adjoining pallet and allowing pivoting motion in the plane of the flat surfaces of the pallets, whereby said pallets are joined into a closed loop with a convex edge of one pallet abutting the concave edge of an adjoining pallet;

means for supporting said pallets on their sides opposite to their flat surfaces consisting of a plurality of rollers arrayed along the conveyor course, each of the rollers being rotatably journaled about a shaft, and means for supporting the shafts transversely to the course of the conveyor including resilient retainer means taking the form of rectangular blocks having slots formed on at least a pair of opposed sides and means for supporting said resilient retainer means with respect to the conveyor course consisting of track members having a pair of opposed vertical surfaces operative to engage the slots in the side of the retainer means so as to removably support the retainer means therein;

means for restraining said pallets against motion transverse to their course;

means for guiding said pallets along a closed course; and means for moving said pallets along said course.

2. The conveyor of claim 1 wherein the rollers are arrayed in two courses, each extending parallel to the conveyor course, and separated from one another by less than the width of a pallet.

References Cited

UNITED STATES PATENTS

| | | | |
|---|---|---|---|
| 756,600 | 4/1904 | Dodge | 198—184 X |
| 1,191,434 | 7/1916 | Keith | 198—181 |
| 1,632,569 | 6/1927 | Taylor | 198 |
| 2,627,339 | 2/1953 | Whiting | 198—181 |
| 2,227,971 | 1/1941 | Hansen | 308—1 |

FOREIGN PATENTS

| | | |
|---|---|---|
| 724,088 | 1/1932 | France. |
| 1,039,010 | 8/1966 | Great Britain. |
| 381,282 | 10/1964 | Switzerland. |

EDWARD A. SROKA, *Primary Examiner.*